US008732761B2

(12) United States Patent
Mathews et al.

(10) Patent No.: US 8,732,761 B2
(45) Date of Patent: May 20, 2014

(54) CONTENT DISCOVERY AND DELIVERY WITH MULTIPLE SERVERS

(75) Inventors: Robin Montague Mathews, Westford, MA (US); Samuel O. Akiwumi-Assani, Beacon, NY (US); Tushar Saxena, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 12/980,617

(22) Filed: Dec. 29, 2010

(65) Prior Publication Data
US 2012/0174161 A1 Jul. 5, 2012

(51) Int. Cl.
*H04N 5/445* (2011.01)

(52) U.S. Cl.
USPC ............................................ 725/48; 709/219

(58) Field of Classification Search
USPC .................. 725/37–61, 78–85; 709/217–232
See application file for complete search history.

(56) References Cited

U.S. PATENT DOCUMENTS

| 7,082,456 | B2 * | 7/2006 | Mani-Meitav et al. ........ 709/203 |
| 2002/0154892 | A1 * | 10/2002 | Hoshen et al. ................... 386/87 |
| 2005/0028208 | A1 * | 2/2005 | Ellis et al. ......................... 725/58 |
| 2006/0048187 | A1 * | 3/2006 | Lubbers et al. ................... 725/46 |
| 2007/0124779 | A1 * | 5/2007 | Casey et al. ....................... 725/87 |

* cited by examiner

*Primary Examiner* — Annan Shang

(57) ABSTRACT

A system may include a client and a home media server in communication with the client. The home media server may be configured to receive a request for media content from the client; determine content restrictions associated with the client; discover at least one other home media server; receive content listings of media content from the at least one other home media server; aggregate the received content listings to create a unified content listing including instances of media content stored on multiple home media servers; filter the unified content listing according to the content restrictions; and send the filtered unified content listing to the client.

21 Claims, 4 Drawing Sheets

CONTENT DISCOVERY AND DELIVERY WITH MULTIPLE SERVERS

BACKGROUND

The advent of computers, electronic communication, and other advances in the digital realm of consumer electronics has resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of digital services such as video-on-demand, internet protocol television ("IPTV"), and personal video recording.

An STB is typically connected to a media content provider, and includes hardware and software necessary to provide enhanced options for a subscriber television system at a subscriber location. An STB is usually configured to provide users with a large number and variety of media content choices. For example, a user may choose to view a variety of broadcast television programs, pay-per-view services, video-on-demand programming, Internet services, and audio programming via an STB.

DETAILED DESCRIPTION

A typical American home includes two or three televisions. Households that subscribe to media content services tend to have more televisions than average. For households that subscribe to media content services, each television may require its own STB to connect to the media content provider. Because these STBs are typically not in communication with one another, a show recorded on one STB may not be available for viewing on another STB in the home. Moreover, STBs may be expensive to purchase or rent, and each additional STB may increase the overall cost of media content to the household.

Rather than requiring each television to be connected to its own STB, a client-server system may be implemented in which a relatively small number of home media servers are installed in the home to support a larger number of client devices. Each home media server may be in communication with the media content provider, and each television may then use one of several thin client devices to access the nearest home media server. In turn, the home media servers may include one or more client handlers configured to respond to requests from the client devices. Such a client-server system may allow for smaller and simpler client devices than requiring a full STB for each television. In some examples, the client functionality may be implemented substantially as embedded hardware and/or software included within the television itself.

In a client-server system having multiple home media servers, each home media server may store different media content. To allow a client connected to one of the home media servers to have access to media content stored on the other servers, not merely to the media content on the server to which the client is connected, the multiple home media servers may be configured to aggregate their content into a single unified content view. This unified content view may then be presented to the client. If a client selects an instance of media content from the unified content view, the home media server that contains the selected media content may then deliver it to the client. If multiple home media servers contain the same media content, then the closer home media server or the home media server with the lowest load may deliver the media content to the client.

Accordingly, clients in the system may select and receive media content without the complexity of being aware of which home media server may be storing the media content. At the same time, because content aggregation may be performed by the home media servers, content restrictions may be maintained by the home media servers to control client access and thereby prevent client devices from seeing or accessing content to which they lack permission.

Figure 1:
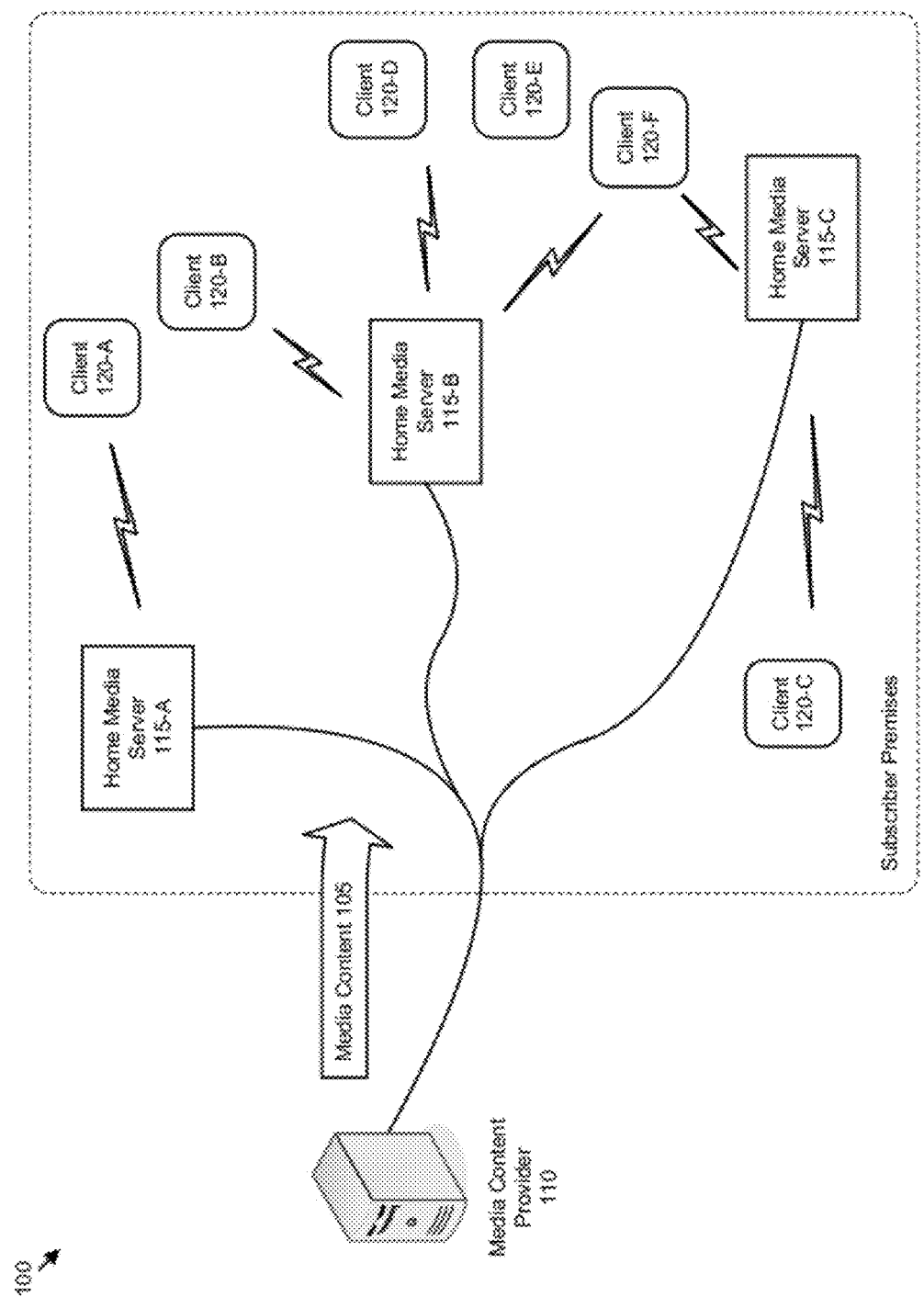
FIG. 1 illustrates an exemplary system having a client-server implementation of the serving of media content.

FIG. 1 illustrates an exemplary system 100 having a client-server implementation for accessing and viewing instances of media content 105. The system 100 includes a media content provider 110 configured to provide media content 105 to a plurality of home media servers 115. Each home media server 115 may communicate with and provide media content 105 to one or more of a plurality of clients 120. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The terms media content instance (or instance of media content 105) may be used to refer generally to any television program, on-demand program, pay-per-view program, broadcast media program, video-on demand program, commercial, advertisement, video, multimedia, movie, song, photograph, audio programming, network services (e.g., Internet), or any segment, portion, component, or combination of these or other forms of media content that may be presented to and experienced (e.g., viewed) by a user. A media content 105 instance may have one or more components. For example, an exemplary media content 105 instance may include a video component and an audio component. Media content 105 may include one or more media content 105 instances.

The media content provider 110 may be configured to provide various types of media content 105 including, but not limited to, any of the forms of media content 105 described above. The media content provider 110 may further be configured to provide other data, such as media content 105 metadata for the display of an interactive program guide. As some examples, media content 105 metadata may include subject matter, genre (e.g., comedy, drama), production date, release date, cast and crew names, content ratings (e.g., general, mature, etc.), intended audience (i.e., target audience), synopsis of the media content 105, producer names, and producer biographies.

The media content provider 110 may include one or more servers configured to communicate with the home media server 115 via one or more types of networks and communications links. Exemplary networks may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network. In some examples, media content 105 and interactive program guide data may be provided by separate servers within the media content provider 110.

The home media servers 115 may be configured to communicate with and receive media content 105 containing one or more media content 105 instances from the media content provider 110. The home media server 115 may further be configured process the media content 105 provided by the media content provider 110. For example, the home media server 115 may include one or more tuners configured to extract and process media content 105 from particular television channels, streams, addresses, and/or frequencies.

The media content 105 processed by a tuner of the home media server 115 may be temporarily buffered, or stored, in a live cache buffer. If there are multiple tuners, each tuner may be associated with a live cache buffer configured to store received media content 105. The received media content 105 stored in a live cache buffer may be served to one or more clients 120 of the home media server 115. In many examples, the home media server 115 may include multiple tuners to allow for multiple instances of media content 105 to be simultaneously processed and/or served.

The media content 105 stored in the live cache buffer may be more permanently stored on a storage device of home media server 115 as a recording. Storage devices may include one or more data storage media or devices, such as hard drives, network drives, flash drives, magnetic discs, optical discs, or any other tangible non-transitory storage media.

The system 100 may have one or more home media servers 115. As shown, the system 100 includes three home media servers 115, labeled 115-A through 115-C. In some installations, a single home media server 115 may be adequate to serve the clients 120 of a subscriber premises. In other examples, due to the size of the subscriber premises or the number of clients 120 to be supported, the system 100 may include multiple home media servers 115. For instance, larger subscriber premises may require multiple home media servers 115 because a single home media server 115 may lack the transmission range to serve all the clients 120 within the premises. Or, a subscriber premises with a large number of clients 120 may require additional home media servers 115 to ensure adequate tuner and bandwidth capacity. A client 120 may be configured to prefer to communicate with the nearest home media server 115, but may communicate with any other home media server 115 that is reachable or within range. Because each home media server 115-A through 115-C may have different media content 105 available, the home media servers 115 may further be configured to perform content discovery, and to aggregate the discovered content into a unified content listing.

The clients 120 may communicate with the home media servers 115 through various communication technologies, devices, media, and protocols supportive of remote data communications, including, but not limited to, intranets, local area networks, wireless networks (e.g., Wi-Fi, Bluetooth), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies. As shown, the system 100 includes six clients 120, labeled 120-A through 120-F.

The clients 120 may be configured to send requests to the home media servers 115, receive a listing of available instances of media content 105, send a selection of an instance of media content 105, and receive the requested media content 105 from the home media servers 115. Likewise, each home media server 115 may be configured to receive requests sent from the plurality of clients 120, aggregate a unified content listing, sent the unified content listing to the clients 120, receive an indication of an instance of media content 105 to provide, indicate to the client 120 which home media server 115 is hosting the selected media content 105, and provide the requested media content 105 to the clients 120 responsive to the requests.

The home media servers 115 may further be configured to filter the unified listing of media content 105 to be provided to the clients 120 according to content restrictions. For instance, the home media server 115 may include or communicate with a profile database to manage various user-specific functions and features, including parental control mechanisms and restrictions. As an example, a parent may specify days and/or times of day during which a child may access media content 105, and/or particular programming channels that a child may or may not access. As another example, a parent may specify that media content 105 of certain genres, content ratings, or intended audiences may be excluded from any listing of media content 105 provided to a child user.

To enforce the content restrictions, a parent may specify a personal identification number (PIN) to be entered by a child prior to accessing media content 105, as well as particular media content 105, e.g., programming, that a child may access after providing the PIN. The home media server 115 may receive the PIN and determine the client 120 permissions accordingly. As another example, the home media server 115 may enforce the content restrictions based on the identity of the client 120 itself, such as by way of a network address (e.g., IP address, MAC address, etc.) associated with the client 120 device. Once the identity of the client 120 is established by the home media server 115, filtering of the unified listing of media content 105 may be performed by matching characteristics or criteria specified by the parent user against media content 105 metadata associated with the media content 105. Accordingly, the unified content listings sent to the clients 120 may be filtered according to the content restrictions of the client 120.

Figure 2:
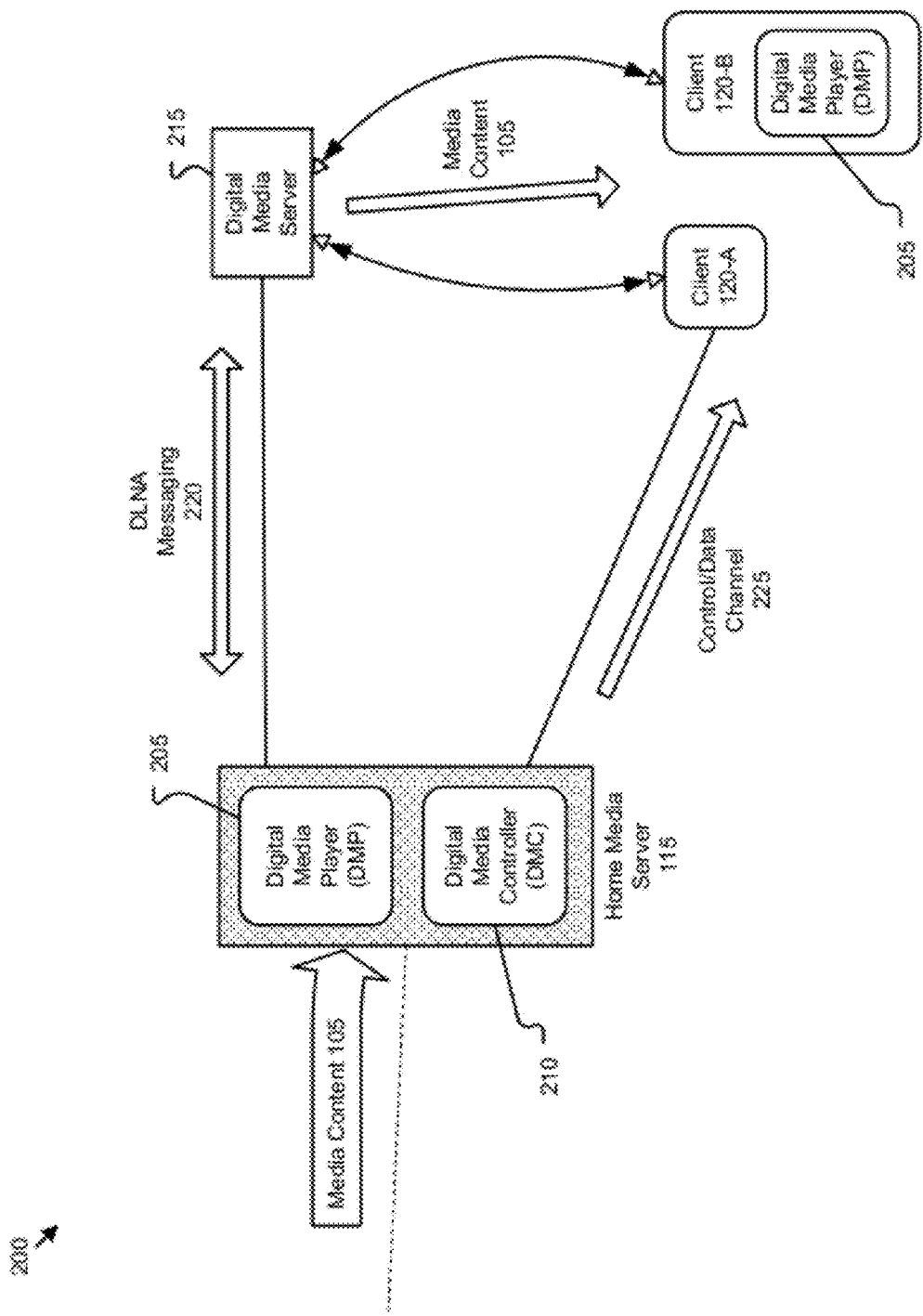
FIG. 2 illustrates an exemplary portion of a system for content discovery and delivery to clients.

FIG. 2 illustrates an exemplary portion of a system 200 for content discovery and delivery of media content 105 to clients 120. The system 200 may include a home media server 115 configured to implement both digital media player (DMP) 205 and digital media controller (DMC) 210 functionality, such as the DMP and DMC functionality as defined by the Digital Living Network Alliance® (DLNA). One or more open clients 120-A and one or more proprietary clients 120-B may be configured to allow a user of a client 120 to receive a listing of media content 105, select an instance of media content 105 from the listing, and receive the instance of media content 105. To facilitate the listing of media content 105, a digital media server (DMS) 215, such as the DMS defined by the DLNA®, may be configured to communicate with the home media server 115 by DLNA® messaging 220. To facilitate the selection and receipt of a selected instance of media content 105, clients 120 may be configured to communicate with the home media server 115 by way of a content/data channel 225.

The DLNA® is a collaboration of various manufacturers that publish interoperability guidelines for the operation of home and mobile media systems. The DLNA® divides devices into various open-ended device classes, each class of which performs a portion of the process of discovery and exchange of content. In particular DLNA® includes standards for discovery, transfer, and rendering of content, such as the media content 105 described above. While DLNA® device definitions and terminology are used in the system 200 to facilitate explanation, systems that do not implement DLNA® protocols and definitions may also be used to implement a client-server implementation for accessing and viewing instances of media content 105 as described herein.

A DMP 205 may be a device configured to discover content, such as content available on a DMS 215 or other device. The DMP 205 may further be configured to provide playback and rendering capabilities. A DMC 210 may be a device configured to control the transfer of media content 105 from one device to another, without necessarily taking part in the actual transfer of content. Rather than performing the actual transfer, the DMC 210 may facilitate the DMP 205 in its discovery of content on DMSs 215. As shown, the home media server 115 may include both DMP 205 and DMC 210 functionality to allow the home media server 115 to find instances of media content 105 to be played back and also to facilitate the discovery of located content to one or more clients 120 of the home media server 115. In other examples, a client 120, such as the client 120-B, may include DMP 205 functionality to allow the client 120-B to perform media content 105 discovery.

A DMS 215 may be a storage device configured to store media content 105. The DMS 215 may further be configured to make the media content 105 available to networked devices such as one or more DMPs 205. The DMS 215 may thus be responsible for hosting the media content 105 as well as advertising the media content 105 to other devices. Exemplary DMSs 215 may include personal computers, storage devices attached to a network, and storage associated with the home media server 115, such as any included or accessible non-transitory tangible storage media.

A DMR may be a device configured to render or otherwise play media content 105 received from a DMS 215 and facilitated by a DMC 210. A DMR may include display device and or audio device functionality to facilitate the rendering of instances of media content 105. The client devices 120-A and 120-B as shown in the system 200 may implement DMR functionality to allow a user of the client 120 to experience media content 105.

To facilitate the content listing, the DMS 215 may be configured to communicate with the home media server 115 by DLNA® messaging 220. For example, the DMP 205 of the home media server 115 may broadcast a DLNA® message 220 to facilitate the discovery of any and all DMS 215 devices that may be available in the subscriber premises, where any DMS 215 devices may accordingly respond to the DLNA® message 220. The DMP 205 of the home media server 115 may further send a DLNA® message 220 to the located DMS 215 device (or devices) configured to cause the DMS 215 to provide a content listing to the home media server 115 of content stored on the DMS 215. The home media server 115 may further be configured to send a DLNA® message 220 to the DMS 215 configured to cause the DMS 215 to initiate a transfer of a selected instance of media content 105 to the client 120.

To facilitate the selection and receipt of a selected instance of media content 105, clients 120 may be configured to communicate with the home media server 115 by way of a content/data channel 225. A client 120 may be configured to request a listing of available content from the home media server 115 over the content/data channel 225, and may receive the listing of content from the home media server 115 over the content/data channel 225 in response. The listing of available content may be provided as a user interface to client 120, or may be provided as raw data to be assembled into a user interface by a client 120 configured to create user interfaces. The content/data channel 225 may further allow for the client 120 to send a request to the home media server 115 to receive an instance of media content 105 on the content listing from the DMS 215.

As a specific example, the client 120-A may use the illustrated portion of the system 200 to receive media content 105. The DMP 205 functionality of the home media server 115 may perform discovery of the DMS 215 devices in the home using DLNA® messaging 220, and may receive content meta-data from any located DMS 215 devices. The DMP 205 functionality may then aggregate the received information from the DMS 215 devices to form a unified content listing. The client 120-A may request the content listing from the home media server 115 over the control/data channel 225, and the DMC 210 functionality of the home media server 115 may provide the content listing to the client 120-A. The client 120-A may receive a selection from the unified content listing, and may send an indication of the selected instance of media content 105 to the home media server 115 over the content/data channel 225. The DMC 210 functionality may then initiate a DLNA® transfer to the client 120-A from the DMS 215 device on which the instance of media content 105 is stored. The client 120-A may accordingly receive the requested instance of media content 105.

The client 120-B may also perform similar steps in the portion of system 200. Additionally or alternately, because the client 120-B further includes DMP 205 functionality, the client 120-B may discover and browse content available in the subscriber premises itself, independent of the actions of the home media server 115.

While the system 200 allows for content discovery and delivery to the clients 120, because the DMS 215 may freely advertise any media content 105 that may be available, the home media server 115 may lack control over content restrictions and client 120 credentials. In particular, the home media server 115 may be unable to apply content restrictions to the listing of unified media content 105 to filtered media content 105 according to the permissions of the client 120 device.

Figure 3:
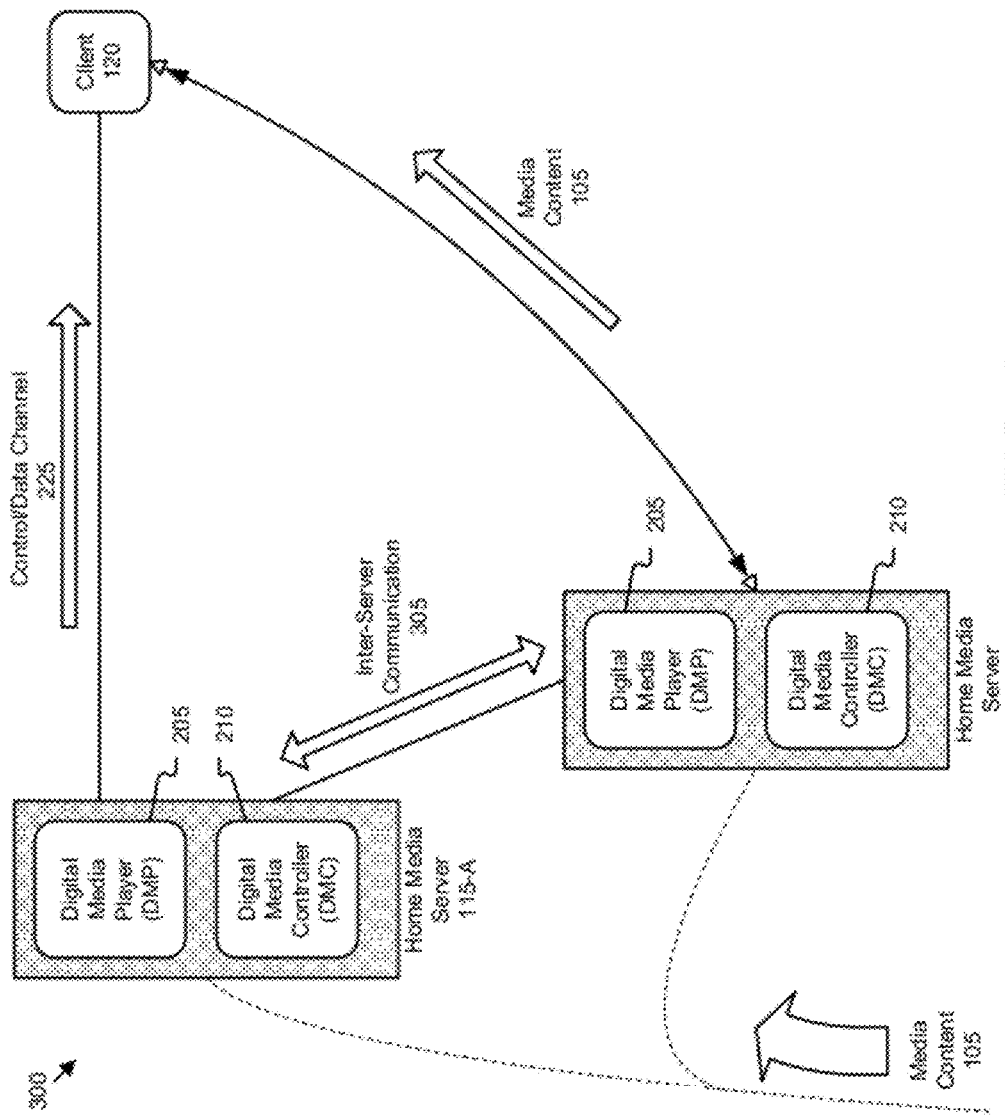
FIG. 3 illustrates an exemplary portion of a system for content discovery and delivery to clients utilizing multiple home media servers.

FIG. 3 illustrates an exemplary portion of a system 300 for content discovery and delivery to clients 120 utilizing multiple home media servers 115. Similar to as discussed above with respect to system 100, system 300 includes multiple home media servers 115, including home media servers 115-A and 115-B. As compared to the discussion of system 200, while the home media servers 115-A and 115-B each include DMP 205 and DMC 210 functionality, the home media servers 115 perform content discovery and delivery messaging by way of an inter-server communication 305 channel, not through use of a DMS 215.

As shown in system 300, a client 120 is in communication with both home media servers 115-A and 115-B, and may receive media content 105 from one or both home media servers 115-A and 115-B. For example, the client 120 may be in communication with home media servers 115-A over a control/data channel 225, and may receive media content 105 from home media servers 115-B over a second control/data channel 225. While only one client 120 is illustrated, systems 300 may include many more clients 120, similar to as illustrated in system 100 of FIG. 1.

To create a unified content listing, the home media servers 115 may communicate over the inter-server communication 305 channel to discover of any and all other home media servers 115 that may be available in the subscriber premises. For instance, the home media server 115 may discover other home media servers 115 through use of a discovery protocol, such as the simple service discovery protocol (SSDP). As an example, home media servers 115 may support notification messages in which services are announced by a hosting home media server 115 by sending a multicast messages to a specific IP multicast address (for example, SSDP IP address 239.255.255.250) at a designated port (e.g., port 1900). The home media servers 115 may further support network search requests configured to allow a requester to search for other devices or devices with certain capabilities as specified by the query. A home media server 115 may accordingly use a network search (such as an SSDP M-SEARCH) to discover other available home media sever 115 devices. SSDP is used herein to facilitate explanation, and other open or proprietary protocols may be used instead of or in addition to SSDP to perform the content discovery over the inter-server communication 305 channel.

Once discovered, the home media server 115 may be configured to request each of the discovered home media servers 115 to send a listing of its available media content 105 to the requesting home media server 115. The home media server 115 may receive these listings of media content 105 responsive to the requests, and may further receive metadata associated with the listings of media content 105. The home media server 115 may aggregate the received listings of media content 105 into a unified content listing. The home media server 115 may further remove any duplicates or redundant instances of media content 105 from the unified content listing.

The home media server 115 may use the received metadata to facilitate the filtering of media content 105 to honor any content restrictions (such as parental controls) required for the client 120 requesting media content 105. Based on the client 120 who is requesting media content 105, the home media server 115 may filter the unified content listing by matching characteristics or criteria specified for the client 120 with media content 105 metadata associated with the media content 105.

As a result, each home media server 115 may be configured to aggregate the content listings while also retaining an ability to control the information propagated to client 120 devices. In particular, the meta-data associated with the instances of media content 105, coupled with the content restriction mechanisms available on the home media server 115, may allow the home media servers 115 to aggregate a unified content list of the media content 105 available on the home media servers 115, filtered according to the content restrictions appropriate for the requesting client 120. The home media server 115 may then send the unified content listing including only what instances of media content 105 are appropriate to the requesting client 120 device, free of the complexity of the client 120 having to be aware of which of the home media server 115 is storing which instances of media content 105.

As a specific example, the home media server 115-A may aggregate a listing of media content 105 from home media server 115-A and home media server 115-B. Upon request by a client 120, the home media server 115-A may filter the listing of content filtered according to those instances of media content 105 that are appropriate to be provided to the client 120. The client 120 may receive and display the filtered unified listing of content in a user interface for selection by a subscriber. The subscriber may accordingly make a selection of an instance of the media content 105 from the user interface.

For some selections, the selected instance of media content 105 may be an instance that is stored on the home media server 115-A itself. In such an instance, the home media server 115-A may initiate a transfer of the selected instance of media content 105 to the client 120. The client 120 may accordingly receive the requested instance of media content 105.

For other selections, the selected instance of media content 105 may be an instance that is stored on home media server 115-B. In such an instance, the content selection may be received by the home media server 115-A, and content initiation information may be provided to the client 120 indicating that the instance of media content 105 will be received from home media server 115-B. The home media server 115-A may further inform the home media server 115-B to initiate delivery of the selected instance of media content 105 to the client 120. In instances where the home media server 115-B may be out of communication range with the client 120, another home media server 115 such as home media server 115-A may be used as an intermediary for provisioning of the requested instance of media content 105 to the client 120.

Accordingly, multiple home media servers 115 may be configured to present an aggregated grouping of media content 105 available in the subscriber premises, while avoiding use of a DMS 215 and thereby allowing the home media servers 115 to maintain control over content permissions. As a result, open standards based clients 120 can interact with the home media servers 115 while the home media servers 115 maintain strict control over the exposed and delivered content, thus enforcing policies such as parental controls to the client 120 devices.

Moreover, because of the inter-server communication 305 channel, the client 120 may select an instance of media content 105 to view without regard to which home media server 115 actually stores the requested instance of media content 105, or which home media server 115 with which the client 120 is presently in communication. In fact, the user interface provided to the subscriber may not even expose indications of which media content 105 is stored on which home media servers 115.

Figure 4:
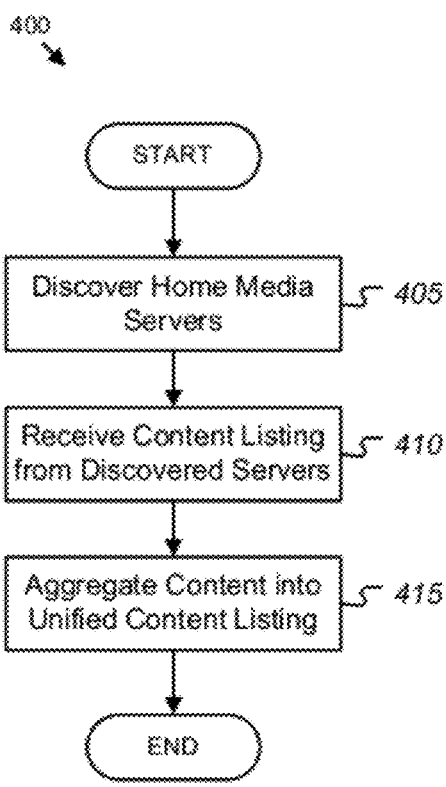
FIG. 4 illustrates an exemplary process for discovery of media content by a home media server.

FIG. 4 illustrates an exemplary process 400 for discovery of media content by a home media server 115. The process 400 may be performed by various systems, such as the systems 100 and 300 described above.

In block 405, the home media server 115 discovers other home media servers 115. For example, the home media server 115 may discover over servers through use of the SSDP protocol.

In block 410, the home media server 115 receives content listings from the discovered other home media servers 115. For example, the home media server 115 may request the discovered home media servers 115 to send listings of their available media content 105. The home media server 115 may receive this information, and may further receive metadata associated with the available media content 105.

In block 415, the home media server 115 aggregates the received content listings into a unified content listing. The home media server 115 may further remove any duplicates or redundant instances of media content 105 from the received content listing. After block 415, the process 400 ends.

Figure 5:
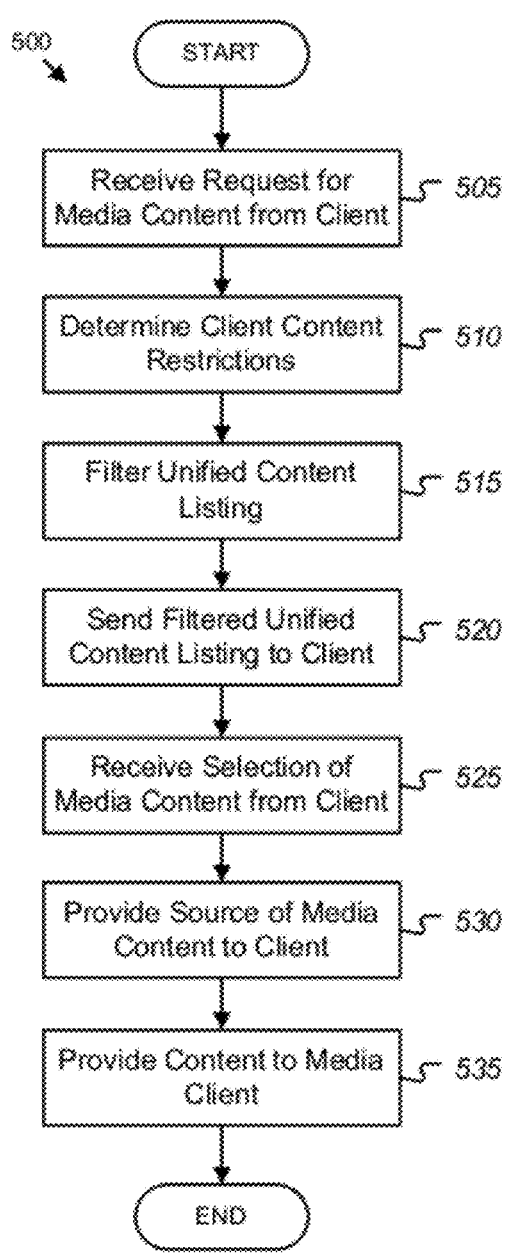
FIG. 5 illustrates an exemplary process for handling requests for media content from a client of a home media server.

FIG. 5 illustrates an exemplary process 500 for handling requests for media content 105 from a client 120 of a home media server 115. As with the process 400, the process 500 may be performed by various systems, such as the systems 100 and 300 described above.

In block 505, the home media server 115 receives a request for media content 105 from a client 120. For example, the home media server 115 may receive a request from the client 120 to view a listing of the instances of media content 105 that are available within the subscriber premises. Upon receipt of the request for media content 105, the home media server 115 may determine what media content 105 is available. In some examples, the home media server 115 may perform the actions of process 400 to determine a unified content listing. In other examples, another home media server 115 may perform the actions of process 400 and may forward the unified content listing to the home media server 115.

In block 510, the home media server 115 determines the client 120 permissions. For example, the client 120 may receive login information such as a PIN from a subscriber, and may provide the login information to the home media server 115 to allow for the access of media content 105. In other examples, the home media server 115 may determine the client 120 permissions based on the identity of the client 120 itself, such as by way of a network address associated with the client 120 device.

In block 515, the home media server 115 filters the aggregated unified content listing according to the content restrictions and permissions of the client 120. For example, the home media server 115 may use metadata of the media content 105 to facilitate the filtering of media content 105 to honor any content restrictions of the requesting client 120, such as any parental control settings. Based on the client 120 who is requesting media content 105, the home media server 115 may then filter the aggregated content listing by matching characteristics or criteria specified by the content restrictions against media content 105 metadata associated with the media content 105.

In block 520, the home media server 115 sends the filtered unified content listing to the client 120. The client 120 may then display the received filtered unified content listing to a subscriber in a user interface. The displayed content listing may be configured to display the unified content listing without informing the subscriber which home media server 115 actually stores what instances of media content 105.

In block 525, the home media server 115 receives a selection of an instance of media content 105 from the client 120. For example, a subscriber may select an instance of media content 105 from the user interface displayed to the subscriber by the client 120.

In block 530, the home media server 115 provides the source of the instance of media content 105 to the client 120. For some selections, the selected instance of media content 105 may be an instance that is stored on the home media server 115 itself. In such an instance, the home media server 115 may indicate to the client 120 that the content may be received from the home media server 115. For other selections, the selected instance of media content 105 may be an instance that is stored on another home media server 115. In such an instance, the content selection may be received by the home media server 115, and content initiation information may be provided to the client 120 indicating that the instance of media content 105 will be received from the other home media server 115. The home media server 115 may further inform the other home media server 115 to initiate delivery of the selected instance of media content 105 to the client 120.

In block 535, the source of the instance of media content 105 provides the instance of media content 105 to the client 120. For example, if the selected instance of media content 105 is stored on the home media server 115, then the instance of media content may be received from the home media server 115. As another example, if the selected instance of media content 105 is stored on another home media server 115, then the instance of media content may be received from the other home media server 115. The client 120 may accordingly receive and display the selected instance of media content 105. After block 535, the process 500 ends.

In general, computing systems and/or devices, such as media content providers 110, home media servers 115 and clients 120, may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope of the systems and methods should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the systems and methods are capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
  a client; and
  a home media server in communication with the client and configured to:
    receive a request for media content from the client;
    determine content restrictions associated with the client;
    discover at least one other media device;
    receive listings of media content from the at least one other media device;
    aggregate to create a unified content listing of media content stored on the home media server and the listings of the media content received from the at least one other media device;
    filter the unified content listing according to the content restrictions;
    send the filtered unified content listing to the client;
    receive a listing selection of the filtered unified content listing from the client; and
    initiate, in response to a selected content based on the listing selection being stored on the least one other media device, a transfer of the selected content to the client from the at least one other media device by instructing the at least one other media device to transmit the selected content.

2. The system of claim 1, wherein the home media server is further configured to aggregate the listings of media content stored on the home media server and the instances of media content at least a subset of the at least one other media device.

3. The system of claim 1, wherein the home media server is further configured to:
  provide a source indication for each listing of the unified content listing to the client.

4. The system of claim 1, wherein the home media server is further configured to determine the content restrictions according to at least one of a personal identification number received from the client and a network address associated with the client.

5. The system of claim 1, wherein the at least one other media device is a second home media server configured to:
  communicate with the home media server via an inter-server protocol; and
  receive transfer instructions initiated by the home media server configured to control the transfer of the selected content to the client by the second home media server.

6. The system of claim 1, wherein the at least one other media device is a digital media server configured to:
  communicate with the home media server via an client-server protocol; and
  receive transfer instructions initiated by the home media server configured to control the transfer of the selected content to the client by the digital home media server.

7. A method, comprising:
  receiving a request for media content from a client at a home media server;
  determining content restrictions associated with the client;
  filtering a unified content listing according to the content restrictions, the unified content listing including listings of media content stored on the home media server and at least one other media device;
  sending the filtered unified content listing to the client;
  receiving a listing selection of the filtered unified content listing from the client; and
  initiating a transfer of a selected content based on the listing selection to the client by the other media device when the selected content is stored on the other media device, the transfer initiated by instructing the at least one other media device to transmit the selected content.

8. The method of claim 7, wherein the source of the selected content is the home media server.

9. The method of claim 7, further comprising:
  discovering the at least one other media device by the home media server;
  receiving content listings of media content from the at least one other media device; and
  aggregating the received content listings of the media content from the at least one other media device to the unified content listing.

10. The method of claim 7, further comprising determining the content restrictions according to a personal identification number received from the client.

11. The method of claim 7, further comprising determining the content restrictions according to a network address associated with the client.

12. The method of claim 7, wherein the at least one other media device is a second home media server, and the method further comprises:
  communicating with the second home media server via an inter-server protocol; and
  initiating the transfer of based on the listing selection to the client by the second home media server when the selected content is stored on the second home media server by providing transfer instructions configured to control the transfer of the selected content to the client.

13. The method of claim 7, wherein the at least one other media device is a digital media server, and the method further comprises:
  communicate with the home media server via an client-server protocol; and
  initiating the transfer of based on the listing selection content to the client by the digital media server when the selected content is stored on the digital media server by providing transfer instructions configured to control the transfer of the selected content to the client.

14. A non-transitory computer-readable medium tangibly embodying computer-executable instructions that when executed by a processor are configured to cause a computing device to:
  discover at least one other media device;
  receive content listings of media content from the at least one discovered other media device;
  aggregate the received content listings to create a unified content listing;
  receive a request for media content from a client;
  determine content restrictions associated with the client;
  filter the unified content listing according to the content restrictions;
  send the filtered unified content listing to the client;
  receive a listing selection of the filtered unified content listing from the client; and
  initiate a transfer of a selected content based on a listing selection to the client by the other media device when the selected content based on the listing selection is stored on the at least one discovered other media device by instructing the at least one other media device to transmit the selected content.

15. The computer-readable medium of claim 14, wherein the computing device is a home media server, and further comprising instructions configured to cause the computing device to aggregate the received content listings with content listings of media content stored on the computing device when creating the unified content listing.

16. The computer-readable medium of claim 14, further comprising instructions configured to cause the computing device to:
  receive the listing selection of the filtered unified content listing from the client; and
  provide an indication of the source of the selected content based on the listing selection.

17. The computer-readable medium of claim 14, further comprising instructions configured to cause the computing device to determine the content restrictions according to at least one of a personal identification number received from the client and a network address associated with the client.

18. The computer-readable medium of claim 14, further comprising instructions configured to cause the computing device to:
  receive a second request for media content from a second client;
  determine content restrictions associated with the second client;
  filter the unified content listing according to the content restrictions associated with the second client; and
  send the second filtered unified content listing to the second client.

19. The computer-readable medium of claim 18, further comprising instructions configured to cause the computing device to:
  receive a second listing selection of the second filtered unified content listing from the second client; and
  provide a second selected content to the second client based on the second listing selection.

20. The computer-readable medium of claim 14, wherein the at least one discovered other media device is a second home media server, and further comprising instructions configured to cause the computing device to:
  communicate with the second home media server via an inter-server protocol; and
  initiate the transfer of based on the listing selection to the client by the second home media server when the selected content is stored on the second home media server by providing transfer instructions configured to control the transfer of the selected content to the client.

21. The computer-readable medium of claim 14, wherein the at least one discovered other media device is a digital media server, and further comprising instructions configured to cause the computing device to:
  communicate with the digital media server via an client-server protocol; and
  initiate the transfer of based on the listing selection to the client by the digital media server when the selected content is stored on the digital media server by providing transfer instructions configured to control the transfer of the selected content to the client.

* * * * *